US011363557B2

(12) United States Patent
Lev et al.

(10) Patent No.: US 11,363,557 B2
(45) Date of Patent: Jun. 14, 2022

(54) DETECTION OF MOBILE TRANSMITTERS IN AN OFFICE ENVIRONMENT

(71) Applicant: NEC Corporation Of America, Herzlia (IL)

(72) Inventors: Tsvi Lev, Tel-Aviv (IL); Yaacov Hoch, Ramat-Gan (IL); Doron Gonen, Modiln (IL)

(73) Assignee: NEC Corporation Of America, Herzlia (IL)

( * ) Notice: Subject to any disclaimer, the term of this patent is extended or adjusted under 35 U.S.C. 154(b) by 84 days.

(21) Appl. No.: 16/202,230

(22) Filed: Nov. 28, 2018

(65) Prior Publication Data

US 2019/0174452 A1 Jun. 6, 2019

Related U.S. Application Data

(60) Provisional application No. 62/593,271, filed on Dec. 1, 2017.

(51) Int. Cl.
| | |
|---|---|
| *H04W 64/00* | (2009.01) |
| *H04W 56/00* | (2009.01) |
| *H04W 4/02* | (2018.01) |
| *H04W 8/08* | (2009.01) |
| *H04B 17/309* | (2015.01) |
| *H04W 24/08* | (2009.01) |
| *H04W 24/02* | (2009.01) |

(Continued)

(52) U.S. Cl.
CPC .......... *H04W 64/003* (2013.01); *H04B 17/27* (2015.01); *H04B 17/309* (2015.01); *H04B 17/318* (2015.01); *H04W 4/02* (2013.01); *H04W 8/08* (2013.01); *H04W 24/02* (2013.01); *H04W 24/08* (2013.01); *H04W 56/009* (2013.01)

(58) Field of Classification Search
CPC .......... B64C 2201/027; B64C 2201/12; B64C 2201/126; B64C 2201/146; B64C 39/024; F41H 11/00; F41H 9/10; G08B 13/1965; G08B 15/00; G08B 21/0247; G08B 25/016; H04W 4/90; H04W 12/12; H04W 24/02; H04W 24/08; H04W 4/02; H04W 56/009; H04W 64/003; H04W 84/12; H04W 8/08; G01S 5/00; G01S 5/0263; H04B 17/27; H04B 17/309; H04B 17/318
USPC ...................................................... 370/329
See application file for complete search history.

(56) References Cited

U.S. PATENT DOCUMENTS

| 2,972,133 A | * | 2/1961 | Macdonald | ........ G08B 13/1627 340/530 |
| 2005/0128989 A1 | * | 6/2005 | Bhagwat | ............. H04L 61/2514 370/338 |

(Continued)

*Primary Examiner* — Kibrom T Hailu
*Assistant Examiner* — Nizam U Ahmed

(57) ABSTRACT

A computer implemented method of detecting unauthorized mobile wireless transmitters, comprising using one or more processors adapted for obtaining, from one or more radio frequency (RF) sensors deployed in a monitored location, RF sensory data relating to a plurality of transmissions transmitted by one or more of a plurality of mobile wireless transmitters, detecting a change in a location of one or more of the mobile wireless transmitters by analyzing the RF sensory data, classifying one or more of the mobile wireless transmitters as unauthorized in case the detected location change deviates from one or more mobility rules and outputting an indication of the classification.

21 Claims, 3 Drawing Sheets

(51) Int. Cl.
   *H04B 17/27*      (2015.01)
   *H04B 17/318*     (2015.01)

(56) References Cited

U.S. PATENT DOCUMENTS

2015/0350902 A1* 12/2015 Baxley ................ H04W 12/122
                                                                726/7
2017/0019877 A1*  1/2017 Ubeda Castellanos ......................
                                                           H04W 64/003
2017/0325056 A1* 11/2017 Mehta .................... H04M 11/04

* cited by examiner

DETECTION OF MOBILE TRANSMITTERS IN AN OFFICE ENVIRONMENT

RELATED APPLICATIONS

This application claims the benefit of priority under 35 USC § 119(e) of U.S. Provisional Patent Application No. 62/593,271 filed on Dec. 1, 2017, the contents of which are incorporated by reference as if fully set forth herein in their entirety.

FIELD AND BACKGROUND OF THE INVENTION

The present invention, in some embodiments thereof, relates to detecting unauthorized mobile wireless transmitters, and, more specifically, but not exclusively, to detecting unauthorized mobile wireless transmitters by detecting a deviation of a location change of the unauthorized mobile wireless transmitters from predefined mobility rules.

Information in general and electronic information in particular has become a fundamental building block for most modern organizations, companies, institutions and/or the like.

Cyber-attacks, cybercrime, information espionage and/or the like may therefore present a major and ever growing concern for any organization reliant on Information Technology (IT).

Major technological advances in communication technologies, energy efficiency and miniaturization as well as in artificial intelligence have paved the way for a new cyber threat in which automated and/or covert devices may be used to infiltrate into an organization in order to compromise the organization information system and/or initiate malicious operations against the organization.

SUMMARY OF THE INVENTION

According to a first aspect of the present invention there is provided a computer implemented method of detecting unauthorized mobile wireless transmitters, comprising using one or more processors adapted for:
  Obtaining, from one or more radio frequency (RF) sensors deployed in a monitored location, RF sensory data relating to a plurality of transmissions transmitted by one or more of a plurality of mobile wireless transmitters.
  Detecting a change in a location of one or more of the mobile wireless transmitters by analyzing the RF sensory data.
  Classifying one or more of the mobile wireless transmitters as unauthorized in case the detected location change deviates from one or more mobility rules.
  Outputting an indication of the classification.

The unauthorized mobile wireless transmitters may typically be used by one or more adversary parties trying to initiate, conduct and/or maintain malicious operations in an attempt to compromise the monitored location and/or resources in the monitored location. Therefore detecting such unauthorized mobile wireless transmitters may significantly improve protection, security and robustness of the monitored location against such malicious adversaries. The deployment of the monitoring system may be further simplified by the use of the diverse types of RF and/or location selected, adapted and/or configured according to the environmental characteristics of each monitored location.

Moreover, one or more of the predefined mobility rules may be easily adapted and/or defined individually for each monitored location according to wireless activity typical to the monitored location. Furthermore, one or more of the RF sensors may be integrated in one or more wireless network apparatuses, for example, a repeater, a switch, a router, a gateway, an access point and/or the like deployed in the monitored location and operatively connected to the network (s) of the monitored location. In such deployments, the RF transceivers used by wireless network apparatus(es) to provide network connectivity may be further used to intercept the RF sensory data. Such deployments may significantly reduce deployment complexity, maintenance effort and/or the like and hence may significantly reduce cost and/or effort.

According to a second aspect of the present invention there is provided a system for detecting unauthorized mobile wireless transmitters, comprising one or more processor adapted to execute code, the code comprising:
  Code instructions to obtain, from one or more radio frequency (RF) sensors deployed in a monitored location, RF sensory data relating to a plurality of transmissions transmitted by one or more of a plurality of mobile wireless transmitters.
  Code instructions to detect a change in a location of one or more of the mobile wireless transmitters by analyzing the RF sensory data.
  Code instructions to classify one or more of the mobile wireless transmitters as unauthorized in case the detected location change deviates from one or more mobility rules.
  Code instructions to output an indication of the classification.

In an optional implementation form of the first and/or second aspects, a spatiotemporal mobility pattern are created for one or more of the mobile wireless transmitters based on the detected location change. The spatiotemporal mobility patterns may present a spatial location pattern such as, for example, a location, a location change, motion and/or movement of one or more of the mobile wireless transmitters. The spatiotemporal mobility pattern(s) may further associate the spatial location pattern with temporal data and optionally present the spatial location pattern over a prolonged time period to track the location change of the respective mobile wireless transmitter in the monitored location. This may allow further identifying spatiotemporal patterns typical potential malicious mobile wireless transmitters used by the adversary(s).

In a further implementation form of the first and/or second aspects, the one or more mobility rules may include, for example, one or more predefined mobility patterns, a location of the one or more mobile wireless transmitters, a timing of one or more of the plurality of transmissions, a type of one or more of the plurality of transmissions, a protocol of one or more of the plurality of transmissions, a size of one or more of the plurality of transmissions, an identification (ID) of one or more of the mobile wireless transmitters, an authentication of one or more of the mobile wireless transmitters and/or the like. The mobility rules may allow easy, efficient and robust adaptation of the monitoring system to a wide and diverse span of monitored locations.

The mobility rules may be adapted, configured and/or tailored according to a plurality of threats, for example, different malicious operations, different types of the mobile wireless transmitters, different transmission methods, different carriers and/or the like. This may allow easy, simple and typically fast adaptation of the monitoring system to new threats.

In a further implementation form of the first and/or second aspects, one or more of the RF sensors are adapted to intercept a plurality of signals of the transmission. The analysis comprises identifying the location change according to identification of one or more signal characteristics of the plurality of signals, the one or more signal characteristics may include, for example, signal strength, a signal angular distribution, a signal propagation delay and/or the like. As the RF sensors may support various RF transmission characteristics, the analysis may allow efficient, accurate and robust detection of the location and specifically the location change of the mobile wireless transmitter(s).

In a further implementation form of the first and/or second aspects, the one or more RF sensors comprise one or more Doppler Effect sensors adapted to capture one or more Doppler shifts in one or more carrier signals of one or more of the plurality of transmissions, the analysis comprises identifying the location change according to the identified one or more Doppler shift. As the RF sensors may support interception of the Doppler shifts, the analysis may allow efficient, accurate and robust detection of the location and specifically the location change of the mobile wireless transmitter(s).

In an optional implementation form of the first and/or second aspects, the RF sensory data is obtained from a plurality of RF sensors. The analysis comprises identifying the location change by triangulating an origin point of one or more of the plurality of transmissions which is indicative of a location of one or more of the mobile wireless transmitters. The analysis may employ robust and efficient triangulation technique(s) as known in the art to accurately detect the location and specifically the location change of the mobile wireless transmitter(s).

In an optional implementation form of the first and/or second aspects, the analysis comprises correlating the location change with a carrier location change of a carrier hosting one or more of the mobile wireless transmitters detected by analyzing location sensory data obtained from one or more location sensors. The carrier may be, for example, a person, a mobile robotic device, a drone and/or the like. Correlating the location changes of the mobile wireless transmitter(s) with the carrier location changes of its respective carrier(s) may significantly improve certainty of the classification. This results from the ability to validate the carrier(s) as authorized or unauthorized and hence classify accordingly the respective mobile wireless transmitter(s) associated with the carrier(s). Moreover, the correlation of the mobile wireless transmitter(s) with their carrier(s) may significantly reduce false positive classification in which an authorized wireless transmitter is classified as unauthorized.

In a further implementation form of the first and/or second aspects, one or more of the location sensors are acoustic sensors adapted to intercept a sound generated by the carrier. Capturing noise and/or sound typically generated by the carrier(s) may allow accurate detection of the location of the carrier(s), specifically its location changes. Moreover, deploying acoustic sensor(s) may be highly efficient for various types of monitored locations, for example, dark locations, large spaces and/or the like.

In a further implementation form of the first and/or second aspects, one or more of the location sensors are air pressure sensors adapted to identify one or more air pressure shifts induced by the carrier. Capturing air pressure shifts typically generated by the carrier(s), specifically the drone type carrier(s) may allow accurate detection of the location of the carrier(s), specifically its location changes. Moreover, deploying air pressure sensor(s) may be highly efficient for various types of monitored locations, for example, small locations in which high accuracy of the carrier location may be essential and/or the like.

In a further implementation form of the first and/or second aspects, one or more of the location sensors are motion sensors adapted to identify a motion of the carrier. Capturing motion of the carrier(s) may allow accurate detection of the location of the carrier(s), specifically its location changes.

In a further implementation form of the first and/or second aspects, one or more of the location sensors are imaging sensors adapted to capture one or more images of at least part of the monitored location, one or more of the images are analyzed to identify the carrier. Analyzing imagery data captured by imaging sensor(s) may allow accurate detection of the location of the carrier(s), specifically its location changes. Moreover, deploying imaging sensor(s) may be highly efficient for various types of monitored locations, for example, large spaces, open view (minimal blocking of line of sight) locations and/or the like.

In an optional implementation form of the first and/or second aspects, the classification is based on an identification of one or more of the mobile wireless transmitters. Verifying the mobile wireless transmitters by their identification (ID) may allow high classification certainty as the detected ID may be compared, for example, to a white list of authorized mobile wireless transmitters, a black list of unauthorized mobile wireless transmitters and/or the like.

In an optional implementation form of the first and/or second aspects, the classification is based on an authentication sequence conducted with one or more of the mobile wireless transmitters. Verifying the mobile wireless transmitters according to an authentication procedure may allow high classification certainty as the mobile wireless transmitters needs to follow a predefined procedure which may only be valid to authorized mobile wireless transmitters while unauthorized mobile wireless transmitters will fail such authentication.

In an optional implementation form of the first and/or second aspects, one or more actions are initiated according to the classification, for example, generating an alert, preventing an access initiated by the one or more mobile wireless transmitters to one or more network resources of the monitored location, intercepting the transmission, interrupting the transmission, invoking one or more deception measures and/or the like.

The actions may be configured, selected and/or adapted according to security measures applied in the monitored location in order to report of the unauthorized and potentially malicious mobile wireless transmitter(s) and optionally, divert, prevent, contain and/or otherwise counter potential malicious operations initiated by the unauthorized mobile wireless transmitter(s).

In an optional implementation form of the first and/or second aspects, at least some of the plurality of transmissions is interrupted using one or more RF transmitters adapted to jam the transmission according to a location of one or more of the detected mobile wireless transmitters. Jamming the transmission of the unauthorized and potentially malicious mobile wireless transmitter(s) may allow diverting, preventing and/or otherwise countering potential malicious operations initiated by the unauthorized mobile wireless transmitter(s). Moreover, adapting the jamming action according to the detected location of the unauthorized mobile wireless transmitter(s) may significantly increase effectivity of the jamming action as the jamming measures may be focused to the exact location of the unauthorized mobile wireless transmitter(s).

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION OF SPECIFIC EMBODIMENTS OF THE INVENTION

Figure 1:
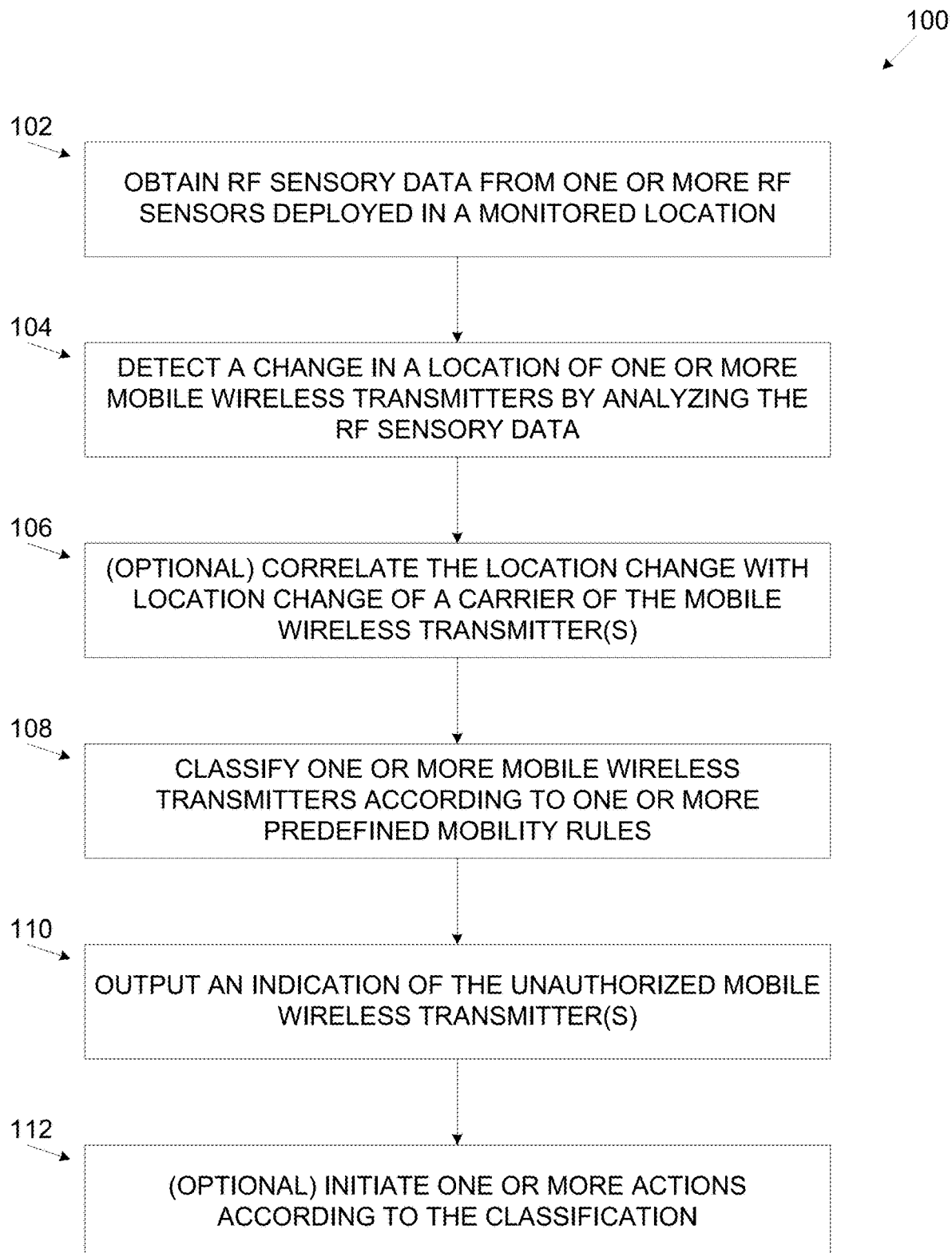
FIG. 1 is a flowchart of an exemplary process of detecting unauthorized mobile wireless transmitters, according to some embodiments of the present invention.

The present invention, in some embodiments thereof, relates to detecting unauthorized mobile wireless transmitters, and, more specifically, but not exclusively, to detecting unauthorized mobile wireless transmitters by detecting a deviation of a location change of the unauthorized mobile wireless transmitters from predefined mobility rules.

According to some embodiments of the present invention, there are provided methods, systems and computer program products for detecting one or more unauthorized mobile wireless transmitters in a monitored location, for example, an organization facility, an institution facility, a secure facility, an office, a home, a production floor and/or the like. The monitored location may be monitored by one or more Radio Frequency (RF) sensors and optionally by one or more location sensors. RF sensory data obtained from the RF sensor(s) may be analyzed to detect a location and specifically a location change(s) of one or more of the mobile wireless transmitter(s) detected in the monitored location. The mobile wireless transmitters may be classified as authorized or unauthorized according to one or more predefined mobility rules. Optionally, the location change(s) of one or more of the mobile wireless transmitter(s) may be correlated with location change(s) of one or more mobile carriers carrying, hosting and/or integrating the mobile wireless transmitter(s) detected by analyzing location sensory data obtained from the location sensor(s).

As wireless communication is commonly used in most facilities, a plurality of wireless transmitters, for example, cellular, Wireless Local Area Network (e.g. Wi-Fi), Bluetooth and/or the like may typically be present at one time or another in the monitored location.

Some if not most of the wireless transmitters may be part of equipment, apparatuses, devices and/or the like authorized for operation in the monitored location, for example, network resources of the monitored location, devices used by authorized personnel and/or the like. However, one or more of the wireless transmitters may be used by covert devices deployed in the monitored location by one or more adversary parties, for example, a potential attacker, a potential business rival, a competitor, a malicious commercial, intelligence, defense and/or state espionage agency and/or the like. The covert devices may be used to conduct, launch and/or initiate one or more malicious operations in the monitored location, for example, intercept wireless transmissions, eavesdrop on conversations, capture images and/or video, operate Human-Machine Interface (HMI) devices of endpoints (e.g. a computer, a terminal, a laptop, a server, etc.) to collect information, launch cyber-attacks and/or the like.

The adversary party(s) may prefer mobile covert devices which may be better suited to avoid detection compared to stationary devices that may be easily detected in the monitored location. Such mobile covert devices may be carried, hosted and/or integrated by one or more (mobile) carrier, either a human carrier (a person) and/or by automated carriers, either remotely controlled and/or autonomous, for example, a mobile robotic device, a drone and/or the like. In order to accomplish the malicious operation(s), the covert devices may typically use the wireless transmitters to communicate with remote resources, specifically remote resources of the adversary party(s), for example, to provide captured and/or intercepted information, to launce and/or escalate the cyber-attack(s) and/or the like.

The wireless transmitters used by the mobile covert devices may therefore be referred as mobile wireless transmitters and their detection may present a major challenge. This challenge may present further complexity as some mobile wireless transmitters may be carried by authorized personnel of the monitored location.

To detect the unauthorized mobile wireless transmitter(s) a monitoring system may be deployed in the monitored location. The monitoring system may connect to one or more RF sensors, for example, a wireless receiver, a Doppler Effect sensor and/or the like adapted to monitor the monitored location and intercept transmission signals transmitted by the mobile wireless transmitter(s).

The monitoring system may analyze RF sensory data obtained from the RF sensor(s) in order to detect a location, in particular location changes (movement) of one or more of the mobile wireless transmitters. Optionally, the monitoring system detects a spatiotemporal mobility pattern for one or more of the mobile wireless transmitters. The spatiotemporal mobility pattern(s) may present a spatial location pattern, for example, a location, a location change, motion and/or movement of a respective mobile wireless transmitter, specifically associated with timing, for example, a timeline, a time, a date, an order and/or the like.

The spatiotemporal mobility pattern(s) may further describe temporal information specifically with relation to the spatial location pattern, for example, the spatial location may be presented over extended periods of time. This may significantly improve detection of mobile wireless transmitter(s) which may be deployed by the adversary to operate for a long time in the protected area.

Optionally, the monitoring system correlates the detected location change(s) of one or more of the mobile wireless transmitters with a carrier location change of one or more carriers detected in the monitored location. Associating the mobile wireless transmitter(s) with their respective carrier(s) 320 may increase the detection accuracy and may reduce probability of false positive detection.

The monitoring system may obtain location sensory data from one or more of the location sensors deployed in the monitored location, for example, an acoustic sensor, an air pressure sensor, a motion sensor, an imaging sensor and/or the like adapted to monitor the monitored location and detect the location, the movement and/or the location change of one or more of the carriers of the mobile wireless transmitter(s). The monitoring system may analyze the location sensory data to detect a location, specifically a location change (movement) of one or more of the carriers.

For example, by analyzing acoustic sensory data obtained from one or more acoustic sensors, sound and/or noise typically generated by one or more of the carriers may be detected, for example, a walking sound of a person, a speech sound of a person, a motor sound of the motor of a mobile robotic device, a movement sound of a mobile robotic device, a motor sound of the motor of a drone, a rotation sound of rotors of the drone and/or the like.

Optionally, the monitoring system detects a carrier spatiotemporal mobility pattern for one or more carriers of the mobile wireless transmitter(s). The carrier spatiotemporal mobility pattern may present a spatial location pattern, for example, a location, a location change, motion and/or movement of a respective carrier of the mobile wireless transmitter(s), specifically associated with timing, for example, a timeline, a time, a date, an order and/or the like.

The monitoring system may classify the mobile wireless transmitter(s) as authorized or unauthorized according to one or more predefined mobility rules which are defined for the monitored location. The monitoring system may classify the mobile wireless transmitter(s) as authorized or unauthorized based on compliance or deviation (incompliance) of the detected location change and optionally the spatiotemporal mobility pattern of the respective one mobile wireless transmitter with the mobility rule(s).

The mobility rules may include one or more predefined spatiotemporal mobility patterns which may dictate, for example, a location (e.g. a place, a space, an area, etc.) allowed for authorized mobile wireless transmitters, a mobility pattern typical to carriers of authorized mobile wireless transmitters, a timing of the transmission transmitted by authorized mobile wireless transmitters (e.g. a time of day, a time of week, a time of year, duration, a frequency, etc.) and/or the like. The mobility rules may further include one or more transmission rules relating to one or more transmission characteristics of the transmission transmitted by the mobile wireless transmitter(s), for example, a type, a protocol, a size (i.e. an amount of data) and/or the like. The transmission rules may define one or more transmission characteristics typical to mobile wireless transmitters which are authorized in the monitored location.

Optionally, the mobility rules include one or more authentication rules relating to the identification (ID) of the detected mobile wireless transmitter(s), for example, an ID, an authentication and/or the like to authenticate one or more of the mobile wireless transmitters.

The monitoring system may output an indication, for example, a message, an alert and/or the like according to the classification outcome, in particular, the monitoring system may output the indication in case of detection of one or more unauthorized mobile wireless transmitters in the monitored location. In case of the detection of the unauthorized mobile wireless transmitter(s), the monitoring system may take further actions, for example, preventing an access initiated by the unauthorized wireless transmitter(s) to network resources in the monitored location, intercepting and/or interrupting transmission of the unauthorized wireless transmitter(s), invoking deception measures and/or the like.

Detecting the unauthorized mobile wireless transmitters in the monitored location may present significant advantages. First, the unauthorized mobile wireless transmitters may typically be used by adversary parties trying to initiate, conduct and/or maintain malicious operations in an attempt to compromise the monitored location and/or resources in the monitored location. Therefore detecting such unauthorized mobile wireless transmitters may significantly improve protection, security and robustness of the monitored location against such malicious adversaries.

Moreover, the predefined mobility rules may be easily adapted and/or defined individually for each monitored location according to wireless activity typical to each monitored location. This may allow easy, efficient and robust adaptation of the monitoring system to a wide and diverse span of monitored locations. The deployment of the monitoring system may be further simplified by the use of the diverse types of RF and/or location selected, adapted and/or configured according to the environmental characteristics of each monitored location. In addition, the mobility rules may be adapted, configured and/or tailored according to a plurality of threats, for example, different malicious operations, different types of the mobile wireless transmitters, different transmission methods, different carriers and/or the like. This may allow easy, simple and typically fast adaptation of the monitoring system to new threats.

Furthermore, correlating the location changes of the mobile wireless transmitters with the carrier location changes of their respective carriers may significantly improve certainty of the classification as the carrier may be validated as authorized or unauthorized and hence the respective mobile wireless transmitter(s) associated with the carrier may be classified accordingly. For example, assuming no drones and/or mobile robotic devices are allowed in the monitored location, mobile wireless transmitters correlated with such carriers may be classified as unauthorized. Moreover, the correlation of the mobile wireless transmitter(s) with their carrier(s) may significantly reduce false positive classification in which an authorized wireless transmitter is classified as unauthorized.

In addition one or more of the RF sensors may be integrated in one or more wireless network apparatuses, for example, a repeater, a switch, a router, a gateway, an access point and/or the like deployed in the monitored location and operatively connected to the network(s) of the monitored location. In such deployments, the RF transceivers used by wireless network apparatus(s) to provide network connectivity may be further used to intercept the RF sensory data. Such deployments may significantly reduce deployment complexity, maintenance effort and/or the like and hence may significantly reduce cost and/or effort.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart of an exemplary process of detecting unauthorized mobile wireless transmitters, according to some embodiments of the present invention. A process 100 may be executed to detect one or more unauthorized mobile wireless transmitters in a monitored location monitored by one or more RF sensors and optionally location sensors by classifying the mobile wireless transmitter(s) according to one or more predefined mobility rules.

The mobile wireless transmitters may typically be hosted and/or carried by one or more mobile carriers, for example, a person, a mobile robotic device, a drone and/or the like which may be used by one or more adversary parties to conduct one or more malicious operations in the monitored location, for example, intercept wireless transmissions, eavesdrop on conversations, capture images and/or video, operate HMI devices of endpoints to collect information, launch cyber-attacks and/or the like.

The mobile wireless transmitter may then communicate with one or more remote resources, in particular remote (off-site) resources of the adversary party(s) in order to provide the captured and/or intercepted information as well as to launce and/or escalate the cyber-attack(s). The mobile wireless transmitter(s) may utilize one or more wireless communication networks, protocols, infrastructures and/or the like, for example, cellular, WLAN, Bluetooth and/or the like for communicating with the remote resources.

The RF sensors, for example, a wireless receiver, a Doppler Effect sensor and/or the like may be deployed in the monitored location, for example, an organization facility, an institution facility, a secure facility, an office, a home, a production floor and/or the like. The RF sensor(s) monitoring the monitored location may be adapted to intercept signals of wireless transmissions transmitted by wireless transmitters located in the monitored location. The RF sensor(s) may provide RF sensory data comprising, for example, signals strength, an angular distribution of the signals, Doppler shifts of the carrier signals and/or the like.

By analyzing the RF sensory data, the origin point of the transmission may be identified and hence a location and/or location changes of one or more wireless transmitters may be detected in the monitored location, in particular, the location(s) and/or the locations changes of the mobile wireless transmitters.

Optionally, one or more locations sensors, for example, an acoustic sensor, an air pressure sensor, a motion sensor, an imaging sensor and/or the like are deployed in the monitored location. The location sensor(s) monitoring the monitored location may be adapted to monitor the monitored location and provide location sensory data which may be analyzed to detect the location(s) and/or the locations changes of one or more (mobile) carriers hosting and/or carrying the mobile wireless transmitters. The detected location(s) and/or location changes of the carrier(s) may be correlated with the detected location(s) and/or location changes of the mobile wireless transmitter(s) to increase an accuracy of the location changes detection.

Optionally, a spatiotemporal mobility pattern comprising the detected location(s) and/or location changes may be detected and/or created for one or more of the mobile wireless transmitters.

The detected locations, location changes and optionally the spatiotemporal mobility pattern(s) of the mobile wireless transmitter(s) may be compared to one or more predefined mobility rules in order to classify one or more of the mobile wireless transmitters as authorized or unauthorized. Unauthorized mobile wireless transmitters may be potentially malicious as they may be operated by one or more of the adversary parties and may therefore present a threat to resources of the monitored location. One or more indications may be therefore generated in case one or more of the detected mobile wireless transmitters are classified as unauthorized.

Optionally, one or more actions may be initiated, in particular, in case one or more unauthorized wireless transmitters are detected. Such actions may include, for example, generating an alert, preventing an access initiated by the unauthorized wireless transmitter(s) to one or more network resources in the monitored location, intercepting and/or interrupting transmission of the unauthorized wireless transmitter(s), invoking deception measures and/or the like. Optionally, the action(s) are initiated according to the detected activity of the carrier hosting the unauthorized wireless transmitter(s) and/or according to the content of the transmission transmitted by the unauthorized wireless transmitter(s).

Figure 2:
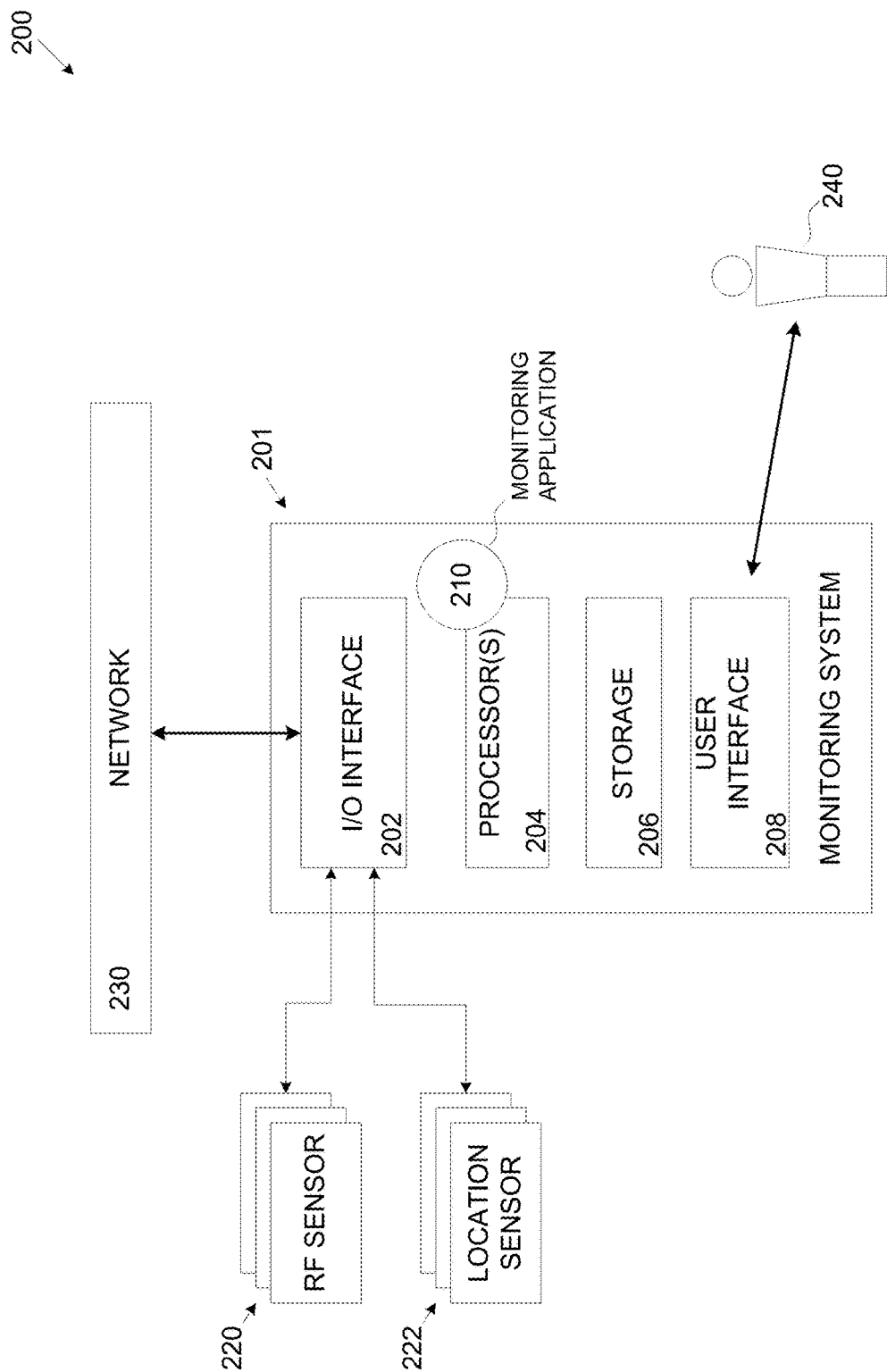
FIG. 2 is a schematic illustration of an exemplary system for detecting unauthorized mobile wireless transmitters, according to some embodiments of the present invention.

Reference is also made to FIG. 2, which is a schematic illustration of an exemplary system for detecting unauthorized mobile wireless transmitters, according to some embodiments of the present invention. An exemplary system 200 for executing a process such as the process 100 to detect unauthorized mobile wireless transmitters in a monitored location may include a monitoring system 201 comprising a an Input/Output (I/O) interface 202 for connecting to one or more RF sensors 220 and optionally to one or more location sensor(s) 222, a processor(s) 204 and storage 206.

The I/O interface 202 may include one or more wired and/or wireless interfaces, for example, a Radio Frequency (RF) interface, a Bluetooth interface, a WLAN (e.g. Wi-Fi) interface, a Controller Area Network (CAN) bus interface, a serial interface, a single wire interface and/or the like for connecting and communicating with the RF sensor(s) 220 and optionally to the location sensor(s) 222. The I/O interface 202 may further support connection to one or more wired and/or wireless networks 230, for example, a WLAN, a Local Area Network (LAN), a Wide Area Network (WAN), a Personal Area Network (PAN), a Metropolitan Area Network (MAN), a cellular network and/or the internet to facilitate communication with more or more remote network resources either within the monitored location and/or external to the monitored location.

The processor(s) 204, homogenous or heterogeneous, may include one or more processors arranged for parallel processing, as clusters and/or as one or more multi core processor(s). The storage 206 may include one or more non-transitory persistent storage devices, for example, a hard drive, a Flash array and/or the like. The storage 206 may further comprise one or more network storage devices, for example, a storage server, a network accessible storage (NAS), a network drive, and/or the like. The storage 206 may also include one or more volatile devices, for example, a Random Access Memory (RAM) component and/or the like.

The RF sensors 220 deployed in the monitored location may be adapted to monitor the monitored location and intercept signals of one or more wireless transmissions transmitted by the mobile wireless transmitter(s). For example, the RF sensors 220 may include one or more wireless receivers and/or the like adapted to capture RF sensory data comprising one or more signal characteristics of the signals transmitted during the wireless transmission(s), for example, a signal strength, an angular distribution, a propagation delay and/or the like. In another example, the RF sensors 220 may include one or more Doppler Effect sensors adapted to detect and capture RF sensory data comprising one or more Doppler shifts in one or more carrier signals used for the wireless transmission(s).

Optionally, one or more of the RF sensors may be may be integrated in one or more of network apparatuses, for example, a repeater, a switch, a router, a gateway, an access point and/or the like deployed in the monitored location and operatively connected to the network 230. Specifically, one or more of the RF sensors 220 may be integrated in wireless network apparatuses. The RF transceivers of the wireless network apparatus(s) typically used to provide network connectivity may be further used to intercept the RF sensory data. In such cases, the monitoring system 201 may connect to the RF sensors 220 by communicating over the network 230 with the wireless network apparatus(s) also performing as the RF sensor(s) 220.

The location sensors 222 which may optionally be deployed in the monitored location may be adapted to detect the location, movement and/or location changes of one or more of the carriers hosting, carrying and/or integrating the mobile wireless transmitter(s), for example, a person, a mobile robotic device, a drone and/or the like. For example, the location sensors 222 may include one or more acoustic sensors adapted to capture sound and/or noise generated by the carrier of the mobile wireless transmitter(s). In another example, the location sensors 222 may include one or more air pressure sensors adapted to detect air pressure shifts induced by the carrier of the mobile wireless transmitter(s).

In another example, the location sensors 222 may include one or more motion sensors, for example, a Passive Infrared (PIR) sensor, a microwave (MW) sensor, an imaging sensor and/or the like adapted to detect motion of the carrier(s) of the mobile wireless transmitter(s). In another example, the location sensors 222 may include one or more imaging devices, for example, a camera, a video camera, an infrared camera, a night vision sensor, a thermal imaging sensor and/or the like adapted to capture one or more images of at least part of the monitored location.

The storage 206 may store one or more software modules, for example, an OS, an application, a tool, an agent, a service, a script and/or the like each comprising a plurality of program instructions that may be executed by the processor(s) 204 from the storage 208. The processor(s) 204 may execute a monitoring application 210 for detecting mobile wireless transmitters, in particular unauthorized mobile wireless transmitters in the monitored location.

The monitoring system 201 may be a specifically designed device adapted to detect the location, specifically the location changes of the mobile wireless transmitters in the monitored location. The monitoring system 201 may optionally connect to one or more of the network apparatuses, for example, the repeater, the switch, the router, the gateway, the access point and/or the like deployed in the monitored location and operatively connected to the network 230. Optionally, the monitoring system 201 is integrated in one or more of the network apparatuses.

Moreover, as described herein above, one or more of the RF sensors 220 may be integrated in one or more of the wireless network apparatuses. One or more such wireless network apparatuses may therefore be designed, configured and/or adapted to host (integrate) the monitoring system 201 as well as one or more of the RF sensors 220. For example, the monitoring system 201 may be integrated in a Wi-Fi infrastructure apparatus, for example, a Wi-Fi access point, a Wi-Fi gateway, a Wi-Fi repeater and/or the like which may provide execute one or more software modules supporting an Application Programming Interface (API) thus allowing the monitoring application 210 to obtain signal information relating to one or more wireless transmitters accessing the Wi-Fi infrastructure apparatus, for example, signal strength, angular distribution and/or the like. In another example, the monitoring system 201 may connect, use and/or integrate in one or more general purpose RF scanners set to monitor the Wi-Fi frequency bands.

Optionally, the monitoring system 201 is utilized by one or more remote platforms, for example, a remote server, a cloud computing platform, such as, for example, Amazon Web Service (AWS), Google Cloud, Microsoft Azure and/or the like. Additionally, and/or alternatively, the monitoring application 210 may be implemented as one or more remote services, a remote service, a cloud service, Software as a Service (SaaS), a Platform as a Service (PaaS) and/or the like. In such cases where the monitoring system 201 is implemented through the remote platform(s) and/or the remote service(s), the monitoring application 210 may communicate with the RF sensor(s) 220 and optionally to the location sensor(s) 222 through one or more of the networks connected to the monitored location.

Optionally, the monitoring system 201 includes a user interface 208 for interacting with one or more user 240, for example, an Information Technology (IT) officer, a system administrator, an operator, a security person and/or the like. The user interface 208 may include one or more human-machine interfaces, for example, a keyboard, a pointing device, a touch pad, a display, a touch screen, an audio interface and/or the like for interacting with the user(s) 240. For example, the user interface 208 may be used to present the user(s) 240, for example, a Graphic User Interface (GUI) utilized through one or more of the human-machine interfaces. Naturally, in case the monitoring system 201 is implemented through the remote platform(s) and/or the remote service(s), the monitoring system 201 may be accessible by the user(s) 240 from one or more local client terminals, for example, the processing node using one or more access agents, for example, a web browser, a proprietary local agent of the remote service and/or the like.

Figure 3:
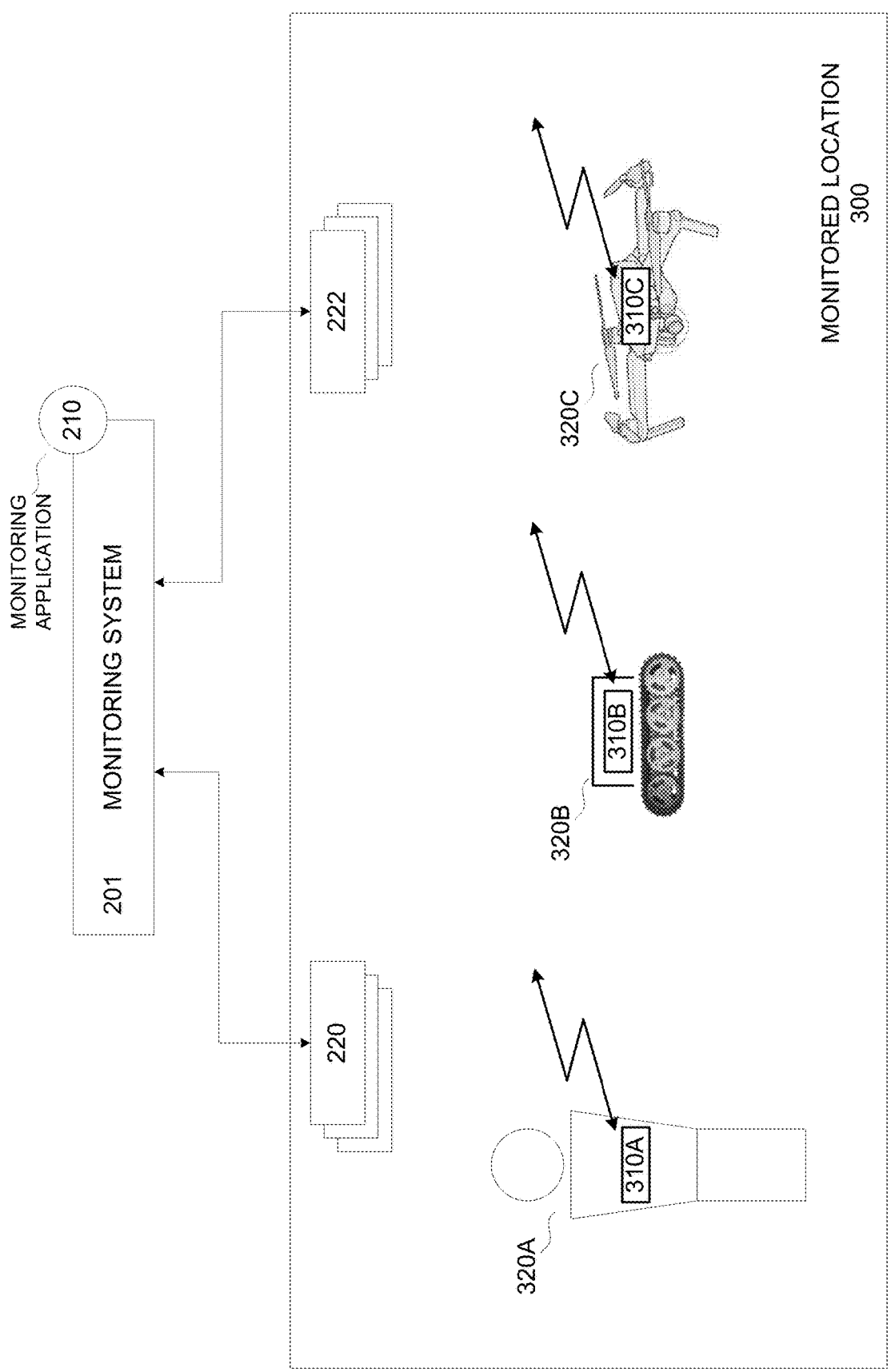
FIG. 3 is a schematic illustration of an exemplary monitored location deployed with a system for detecting unauthorized mobile wireless transmitters, according to some embodiments of the present invention.

Reference is now made to FIG. 3, which is a schematic illustration of an exemplary monitored location deployed with a system for detecting unauthorized mobile wireless transmitters, according to some embodiments of the present invention. An exemplary monitored location 300, for example, an organization facility, an institution facility, a secure facility and/or the like may be deployed with a system such as the system 200. The monitored location 300 may include one or more at least partially distinct areas, for example, a hall, a room, an office, a public area, a corridor, a conference room, an open space, a lobby, a recreation room, a production floor, a yard, a warehouse and/or the like.

A monitoring system such as the monitoring system 201 executing a monitoring application such as the monitoring application 210 may be deployed, installed and/or adapted to classify one or more wireless transmitters, in particular mobile wireless transmitters detected in the monitored location 300 in order to detect one or more unauthorized mobile wireless transmitters. The monitoring application 210 may connect to one or more RF sensors such as the RF sensor 220 deployed in the monitored location 300 to intercept signals of transmission transmitted by one or more of the mobile wireless transmitters in the monitored location 300. The monitoring application 210 may optionally connect to one or more location sensors such as the location sensor 222 deployed in the monitored location 300 to detect location, location changes, motion and/or movement of one or more carriers carrying, hosting and/or integrating one or more of the mobile wireless transmitters.

One or more adversary parties, for example, a potential attacker, a potential business rival, a competitor, a malicious commercial, intelligence, defense and/or state espionage agency and/or the like may attempt to conduct, launch and/or initiate one or more malicious operations in the monitored location, for example, intercept wireless transmissions, eavesdrop on conversations, capture images and/or video, operate HMI devices of endpoints (e.g. a computer, a terminal, a laptop, a server, etc.) to collect information, launch cyber-attacks and/or the like.

To accomplish this, the adversary party(s) may use one or more covert devices carried by one or more carriers, either human carriers (persons) and/or automated carriers. In particular, the covert devices are carried by mobile carriers which may move around the monitored location 300 to perform the malicious operation(s) and may optionally retreat to hidden place(s) in the monitored location and/or leave the monitored location 300 to avoid detection.

One or more human carriers, for example, a person 320A may carry one or more covert devices as, for example, a wearable device, a carried device, an attachable device and/or the like. Such human carried covert devices may typically be small devices which may be easily concealed and/or devices disguised and/or implemented as a common inconspicuous device, for example, a Smartphone, a Tablet, a Watch, Glasses and/or the like. The human carried covert devices may operate while carried by the human carrier 320A visiting the monitored location 300 and may optionally operate while left stationary in the monitored location 300.

The adversary party(s) may use, deploy and/or maneuver one or more of the automated carriers in the monitored location 300. The automated carriers which may be either remotely controlled and/or autonomous, for example, a mobile robotic device 320B, a drone 320C and/or the like which may carry, host and/or integrate the covert devices for conducting the malicious operation(s). The automated carrier(s) may move around the monitored location 300 to perform the malicious operation(s) and optionally keep out of sight. For example, the mobile robotic device 320B may move in the monitored location 300 to initiate one or more of the malicious operations, for example, eavesdrop on conversations, operate one or more HMI devices of one or more endpoints deployed and used in the monitored location 300 and/or the like.

In order not to be detected, the mobile robotic device 320B may further retreat to a hidden place in the monitored location, for example, a venting tunnel, a hidden spot behind/under a piece of furniture and/or the like. In another example, the drone 320C may maneuver into the monitored location 300 to initiate one or more of the malicious operations, for example, to intercept wireless transmissions, to eavesdrop on conversations, to initiate a cyber-attack and/or the like. The drone 320C may further maneuver out of the monitored location 300 and/or maneuver to a hidden place in the monitored location to avoid detection.

The covert devices may typically include one or more wireless transmitters 310, for example, a wireless transmitter 310A carried by the human carrier 320A, a wireless transmitter 310B carried by the mobile robotic device 320B and a wireless transmitter 310C carried by the drone 320C. Since each wireless transmitter 310 is carried by a respective mobile carrier, the wireless transmitters 310 are referred to as mobile wireless transmitters 310. The covert device may use the mobile wireless transmitter(s) 310 to communicate with one or more remote network resources used by the adversary party(s), for example, a remote server, a remote processing node, a remote network, a remote service, a cloud resource, a cloud service and/or the like.

The wireless transmitter(s) 310 may use one or more wireless communication networks, protocols, infrastructures and/or the like, for example, cellular, WLAN, Bluetooth and/or the like to communicate with the remote network resource(s).

Reference is made once again to FIG. 1 and FIG. 2.

As shown at 102, the process 100 starts with the monitoring application 210 obtaining (e.g. collecting, probing, receiving, etc.) RF sensory data from one or more of the RF sensor(s) 220 deployed in a monitored location such as the monitored location 300.

The monitoring application 210 may continuously and/or periodically communicate with the RF sensor(s) 220 to obtain the RF sensory data regardless of detection of a transmission in the monitored location. However in order to reduce communication resources, i.e. bandwidth, load, time and/or the like and potentially reduce power consumption of the RF sensor(s) 220, the monitoring application 210 may obtain the sensory data from the RF sensor(s) 220 following a detection of one or more wireless transmissions in the monitored location 300. Optionally, the RF sensor(s) 220 trigger the communication with monitoring application 210 upon detection of one or more wireless transmission in the monitored location 300.

The RF sensor(s) 220 may intercept transmission signals of one or more wireless transmissions detected in the monitored location 300. The RF sensor(s) 220 may thus capture RF sensory data relating to the wireless transmissions. The RF sensory data may comprise one or more signal characteristics of the signals constituting the wireless transmission(s). As the RF sensor(s) 220 may employ different interception technologies, the RF sensory data obtained from each type of the RF sensor(s) 220 may include RF sensory data typical to the interception technology. For example, assuming the RF sensor(s) 220 include one or more of the wireless receivers, the respective RF sensory data obtained from such wireless receiver(s) may comprise one or more signal characteristics relating to the intercepted signals, for example, a signal strength, an angular distribution, a propagation delay and/or the like. In another example, assuming the RF sensors 220 include one or more of the Doppler Effect sensors, the respective RF sensory data obtained from such Doppler Effect sensor(s) may comprise, one or more Doppler shifts in one or more carrier signals used for the wireless transmissions.

As shown at 104, the monitoring application 210 analyzes the obtained RF sensory data to extract spatiotemporal information relating to the transmission signals in order to detect the location, specifically the location changes (i.e. movement) of one or more of the mobile wireless transmitters 310. As described herein above in step 102, the RF sensory data obtained from different types of the RF sensors 220 may vary according to the interception technologies applied by the respective RF sensors 220. The monitoring application 210 may therefore analyze the obtained RF sensory data accordingly, using analysis methods, techniques and/or tools adapted and suitable for the type of RF sensory data obtained from the RF sensor(s) 220.

For example, assuming the RF sensors 220 include one or more of the wireless receivers adapted to intercept signals of the wireless transmission transmitted by one or more of the mobile wireless transmitters 310. The RF sensory data captured by the wireless receiver(s) may therefore include the signal characteristics of the one or more of the wireless transmission signals, specifically, the signal strength, the signal (radiation) angular distribution, the signal propagation delay and/or the like. The monitoring application 210 may apply one or more methods, techniques and/or the like as known in the art to analyze the signal characteristic(s) in order to identify a signals transmission origin point, i.e. the location of the respective mobile wireless transmitter(s) 310. For example, by analyzing the signal strength, specifically variations in the signal strength, the monitoring application 210 may identify the signals transmission origin point. In another example, by analyzing the angular distribution of the wireless transmission signals, specifically variations in the angular distribution, the monitoring application 210 may identify the signals transmission origin point. In another example, by analyzing the propagation delay (latency) of the wireless transmission signals, specifically variations in the propagation delay, the monitoring application 210 may identify the signals transmission origin point.

In another example, assuming there are multiple wireless receivers adapted to intercept the wireless transmission(s) signals, the monitoring application 210 may apply one or more triangulation techniques as known in the art to analyze the RF sensory data and identify the transmission origin point(s). By extracting spatiotemporal information of the origin point(s), for example, the signal strength, a direction of maximum signal strength and/or the like the monitoring application 210 may identify the location change(s) of the wireless transmitter(s) 310.

In another example, assuming the RF sensors 220 include one or more of the Doppler Effect sensors adapted to identify the Doppler shifts in one or more carrier signals carrying the wireless transmission(s) transmitted by the mobile wireless transmitter(s) 310. The monitoring application 210 may analyze the Doppler shift(s) as known in the art to extract the spatiotemporal information relating to the origin points of the carrier signal(s) and detect the location change(s) of the mobile wireless transmitter(s) 310. The Doppler shifts in the carrier signal(s) may indicate of the velocity direction of the mobile wireless transmitter(s) 310 with respect to the fixed measuring point, i.e. the location of the Doppler Effect sensor(s). Assuming several such Doppler Effect sensor(s) are deployed in the monitored location 300 and given that the (vectorized) Doppler shifts relate to a certain mobile wireless transmitter 310, the location of the certain mobile wireless transmitter 310 may be estimated based on the captured Doppler shifts by minimizing the single location in space (the monitored location 300) and the related velocity vector that produced the measured Doppler shifts.

Optionally, one or more of the RF sensors 220 themselves analyze their respective captured RF sensory data to extract the spatiotemporal information relating to the mobile wireless transmitter(s) 310. Such RF sensor(s) 220 may then provide the extracted spatiotemporal information to the monitoring application 210.

Optionally, the monitoring application 210 detects a spatiotemporal mobility pattern for one or more of the mobile wireless transmitters 310 detected in the monitored location 300. Each of the spatiotemporal mobility patterns may present a spatial location pattern, for example, a location, a location change, motion and/or movement of a respective mobile wireless transmitter 310. Moreover, the spatiotemporal mobility pattern(s) may associate the spatial location pattern with temporal data, for example, a timeline, a time, a date, an order and/or the like to present the spatiotemporal mobility pattern(s). The spatiotemporal mobility pattern(s) may further present the detected spatial location pattern over an extended time period to track the location change of the respective mobile wireless transmitter 310 over an extended time period.

As shown in 106, which is an optional step, the monitoring application 210 correlates the detected location changes of one or more of the mobile wireless transmitters 310 with carrier location changes of one or more of the carriers 320 which carry the respective mobile wireless transmitter(s) 310.

The monitoring application 210 may obtain (e.g. collect, probe, receive, etc.) location sensory data from one or more of the location sensor(s) 222 which may be deployed in the monitored location 300. The monitoring application 210 may continuously and/or periodically communicate with the location sensor(s) 222 to obtain the location sensory data regardless of detection of a transmission in the monitored location.

However in order to reduce the communication resources and potentially reduce power consumption of the location sensor(s) 222, the monitoring application 210 may obtain the location sensory data from the location sensor(s) 222 following a detection of one or more wireless transmissions in the monitored location 300. Optionally, the location sensor(s) 222 are maintained in a low power mode (e.g. sleep, power down, hibernate, etc.) and the monitoring application 210 switches the location sensor(s) 222 to operational mode following a detection of the wireless transmission(s) by one or more of the RF sensor(s) 220. In particular, following detection of the wireless transmission(s) originating from one or more of the mobile wireless transmitters 310.

The monitoring application 210 may analyze the obtained location sensory data to extract spatiotemporal information relating to the carrier(s) 320 in order to detect the location, specifically the location changes (i.e. movement) of one or more of the carriers 320. The location sensor(s) 222 may monitor the monitored location 300 and detect motion of the carrier(s) 320 using different detection technologies, for example, sound/noise detection, air pressure shift detection, motion detection, visual detection and/or the like. As such each type of the location sensor(s) 222 may capture, produce and/or provide a respective type of the location sensory data. The monitoring application 210 may therefore analyze the obtained location sensory data accordingly, using analysis methods, techniques and/or tools adapted and suitable for the type of location sensory data obtained from the location sensor(s) 222.

For example, assuming the location sensors 222 include one or more of the acoustic sensors adapted to capture sound and/or noise generated by one or more of the carriers 320. The location sensory data captured by the acoustic sensor(s) may therefore include sound and/or noise expressed, for example, as audible waves and/or vibrations generated by the carrier(s) 320. The monitoring application 210 may apply one or more methods, techniques and/or the like as known in the art to analyze the captured sound and/or noise in order to identify the presence, movement and/or location changes of the carrier(s) 320.

For example, the monitoring application 210 may compare the captured sound and/or noise to one or more predefined sound and/or noise patterns which may be typical to one or more of the carriers 320, for example, a walking sound of the person(s) 320A, a speech sound of the person(s) 320A, a motor sound of a motor of the mobile robotic device 320B, a movement sound of the mobile robotic device 320B, a motor sound of the motor of the drone 320C, a rotation sound of rotors of the drone 320C and/or the like.

In another example, assuming the location sensors 222 include one or more of the air pressure sensors adapted to capture air pressure shifts induced by one or more of the carriers 320. The sensory data captured by the acoustic sensor(s) may therefore include air pressure information relating to the air pressure in the monitored location 300. The monitoring application 210 may apply one or more methods, techniques and/or the like as known in the art to analyze the air pressure information in order to identify the presence, movement and/or location changes of the carrier(s) 320.

In another example, assuming the location sensors 222 include one or more of the motion sensors, for example, the MR sensor, the MW sensor and/or the like adapted to detect location changes of the carrier(s) 320. The location sensory data captured by the motion sensor(s) may therefore include, for example, a heat signature of the detected carrier(s) 320, coordinates of the detected carrier(s) 320 and/or part thereof and/or the like. The monitoring application 210 may apply one or more methods, techniques and/or the like as known in the art to analyze the captured location sensory data in order to identify the presence, movement and/or location changes of the carrier(s) 320. For example, the monitoring application 210 may analyze the coordinates of the heat signature sensory data to extract the spatiotemporal information relating to the carrier(s) 320 and detect the location change(s) of the carrier(s) 320. In another example, the monitoring application 210 may analyze the coordinates provided by the MW sensor to extract the spatiotemporal information relating to the carrier(s) 320 and detect the location change(s) of the carrier(s) 320.

In another example, assuming the location sensors 222 include one or more of the imaging sensors, for example, the camera, the video camera, the infrared camera, the night vision sensor, the thermal imaging sensor and/or the like adapted to capture one or more images of at least part of the monitored location 300. The monitoring application 210 may apply one or more image and/or vision processing tools, algorithms and/or the like to analyze one or more images depicting the monitored location 300 in order to extract the spatiotemporal information relating to the carrier(s) 320 and detect the location change(s) of the carrier(s) 320. The monitoring application 210 may further analyze multiple images, specifically a series of subsequent images depicting the monitored location 300 in order to identify movement and detect the location change(s) of the carrier(s) 320.

Optionally, one or more of the location sensors 222 themselves analyze their respective captured location sensory data to extract the spatiotemporal information relating to the carrier(s) 320 and provide the extracted spatiotemporal information to the monitoring application 210.

Optionally, the monitoring application 210 detects a carrier spatiotemporal mobility pattern for one or more of the carriers 320 detected in the monitored location 300. Each of the carrier spatiotemporal mobility patterns may present a spatial location pattern, for example, a location, a location change, motion and/or movement of a respective carrier 320. Moreover, the carrier spatiotemporal mobility pattern(s) may associate the spatial location pattern with temporal data, for example, a timeline, a time, a date, an order and/or the like to present the carrier spatiotemporal mobility pattern(s).

The monitoring application 210 may correlate between the locations changes detected for one or more of the mobile wireless transmitters 310 and the locations changes detected for one or more of the carriers 320. Through this correlation, the monitoring application 210 may associate one or more of the mobile wireless transmitters 310 with its respective carrier 320. This association may significantly improve the detection accuracy as different detection domains, i.e. RF signals and physical motion are combined.

Optionally, the monitoring application 210 correlates between the spatiotemporal mobility pattern(s) detected for the mobile wireless transmitter(s) 310 and the carrier spatiotemporal mobility pattern(s) detected for the carrier(s) 320. This may further increase accuracy and/or certainty of the association between the mobile wireless transmitter(s) and their respective carrier(s) 320

As shown in 108, the monitoring application 210 may classify one or more of the mobile wireless transmitters 310 as authorized or unauthorized based on the detected location change(s) and according to one or more mobility rules. Specifically, in case the location change(s) detected for a certain mobile wireless transmitters 310 deviate from one or more of the more mobility rules, the monitoring application 210 may classify one or more of the mobile wireless transmitters 310 as unauthorized. Optionally, when the spatiotemporal mobility pattern is detected for one or more of the mobile wireless transmitters 310, in case the spatiotemporal mobility pattern deviates from the more mobility rule(s), the monitoring application 210 may classify one or more of the mobile wireless transmitters 310 as unauthorized.

The mobility rules may include one or more predefined mobility patterns which may dictate, for example, a location of authorized mobile wireless transmitter(s), a timing of the transmission transmitted by authorized mobile wireless transmitter(s), for example, a time of day, a time of week, a time of year, a duration, a frequency and/or the like. The monitoring application 210 may therefore compare the detected location change(s) and optionally the spatiotemporal mobility pattern of one or more of the mobile wireless transmitters 310 to one or more predefined mobility patterns defined for the monitored location 300. Specifically, authorized mobile wireless transmitters may typically be carried by human carriers that are authorized in the monitored location 300.

The mobility rules may therefore define one or more predefined spatiotemporal mobility patterns mobility patterns typical to the authorized mobile wireless transmitters, i.e. to the authorized human carriers. In case the detected location change(s) or the spatiotemporal mobility pattern of one or more of the detected mobile wireless transmitters 310 deviates from the predefined mobility patterns, the monitoring application 210 may classify the detected mobile wireless transmitter(s) 310 as unauthorized.

For example, one or more of the predefined mobility patterns may define location(s), area(s) and/or the like in the monitored location 300 which are allowed or not allowed for mobile wireless transmitters. The monitoring application 210 may compare the detected location change(s) and optionally the spatiotemporal mobility pattern of a certain mobile wireless transmitter 310 to the predefined mobility pattern(s). Based on the comparison the monitoring application 210 may identify that the certain mobile wireless transmitter 310 is located and/or moves in an unauthorized area and/or location. In such case the monitoring application 210 may classify the certain mobile wireless transmitter 310 as unauthorized.

In another example, one or more of the predefined mobility pattern may define a type of movement of mobile wireless transmitters, for example, significantly horizontal movement typical to human carriers 320A walking in the monitored location 300, a certain speed of movement typical to human carriers 320A and/or the like. The monitoring application 210 may compare the detected location change(s) and optionally the spatiotemporal mobility pattern of a certain mobile wireless transmitter 310 to the predefined mobility pattern(s). Based on the comparison the monitoring application 210 may identify, for example, that the certain mobile wireless transmitter 310 is moving vertically, for example, in the air, on the wall and/or the like, In such case the monitoring application 210 may classify the certain mobile wireless transmitter 310 as unauthorized since it may be carried by an automated carrier such as the mobile robotic device 320B, the drone 320C and/or the like which may typically not be authorized in the monitored location 300.

In another example, based on the comparison, the monitoring application 210 may identify that the certain mobile wireless transmitter 310 is moving in a significantly slow speed which may be indicative that the certain mobile wireless transmitter 310 is carried by the mobile robotic device 320B. Assuming that mobile robotic device(s) 320B are not allowed in the monitored location 300, the monitoring application 210 may classify the certain mobile wireless transmitter 310 as unauthorized. In another example, based on the comparison, the monitoring application 210 may identify that the certain mobile wireless transmitter 310 is moving in a significantly high speed which may be indicative that the certain mobile wireless transmitter 310 is carried by the drone 320C. Assuming that drone(s) 320C are not allowed to in the monitored location 300, the monitoring application 210 may classify the certain mobile wireless transmitter 310 as unauthorized.

In another example, the monitoring application 210 may analyze the spatiotemporal mobility pattern created for a certain mobile wireless transmitter 310 and identify that the certain mobile wireless transmitter 310 is present in the monitored location 300 for an extended period of time, for example, a week, a month and/or the like. Such extended time period may be indicative that the certain mobile wireless transmitter 310 is deployed by the adversary party in the monitored location 300 for a long time and the monitoring application 210 may therefore classify the certain mobile wireless transmitter 310 as unauthorized.

In another example, one or more of the predefined mobility pattern may define a timing, for example, a time of year, a time of week, a time of day and/or the like during which authorized mobile wireless transmitters are allowed or not in the monitored location 300 and/or part thereof. The monitoring application 210 may compare the detected location change(s) and optionally the spatiotemporal mobility pattern of a certain mobile wireless transmitter 310 to the predefined mobility pattern(s). Based on a comparison, the monitoring application 210 may identify, for example, that the certain mobile wireless transmitter 310 is moving in the monitored location 300 during one or more un-allowed times, for example, during non-working hours (e.g. at night, etc.), during non-working days (e.g. weekend, holiday, etc.) and/or the like. In such case the monitoring application 210 may classify the certain mobile wireless transmitter 310 as unauthorized.

The mobility rules may further include one or more transmission rules relating to one or more transmission characteristics of the wireless transmission(s) transmitted by the mobile wireless transmitter(s) 310, for example, a type, a protocol, a size (i.e. an amount of data) and/or the like. The transmission rules may define one or more transmission characteristics typical to mobile wireless transmitters which are authorized in the monitored location 300. For example, the monitoring application 210 may identify that a wireless transmission transmitted by a certain mobile wireless transmitter 310 is a cellular transmission which may not be permitted in the monitored location 300. In such case the monitoring application 210 may classify the certain mobile wireless transmitter 310 as unauthorized. In another example, the monitoring application 210 may identify that a wireless transmission transmitted by a certain mobile wireless transmitter 310 employs a certain protocol which is not permitted for use by authorized wireless transmitters in the monitored location 300. In such case the monitoring application 210 may classify the certain mobile wireless transmitter 310 as unauthorized. In another example, the monitoring application 210 may identify that a wireless transmission transmitted by a certain mobile wireless transmitter 310 comprises an extremely large amount of data which is not typical to wireless transmissions transmitted by authorized wireless transmitters in the monitored location 300. In such case the monitoring application 210 may classify the certain mobile wireless transmitter 310 as unauthorized.

Optionally, the mobility rules include one or more authentication rules relating to the ID of the mobile wireless transmitter(s) 310, for example, an ID, an authentication and/or the like. For example, one or more of the authentication rules may define valid IDs for mobile wireless transmitters that are authorized for operation in the monitored location 300. The monitoring application 210 may identify that a wireless transmission transmitted by a certain mobile wireless transmitter 310 is assigned with an ID of the originating wireless transmitter that is not defined as authorized for operation in the monitored location 300. In such case the monitoring application 210 may classify the certain mobile wireless transmitter 310 as unauthorized.

Moreover, in case the monitoring application 210 identifies a wireless transmission transmitted by a certain mobile wireless transmitter 310, the monitoring application 210 may initiate an authentication sequence with the certain mobile wireless transmitter 310 to authenticate the certain mobile wireless transmitter 310. For example, the monitoring application 210 may initiate a challenge/response sequence with the certain mobile wireless transmitter 310, for example, Extensible authentication protocol, Protected Extensible Authentication Protocol and/or the like. In another example, the monitoring application 210 may initiate the authentication sequence using one or more encryption keys, for example, a public key, a private key and/or the like used by mobile wireless transmitters that are authorized for operation in the monitored location 300. In case the certain mobile wireless transmitter 310 fails the authentication sequence, the monitoring application 210 may classify the certain mobile wireless transmitter 310 as unauthorized.

As shown at 110, the monitoring application 210 may output, for example, transmit, generate and/or the like an indication according to the classification, in particular, the monitoring application 210 may output one or more indications, messages, alerts and/or the like indicating, reporting and/or informing one or more parties of the unauthorized mobile wireless transmitter(s) 310 detected in the monitored location 300. The monitoring application 210 may transmit the detection indication through one or more interfaces of the I/O interface 202, for example, over the network 230.

For example, the monitoring application 210 may transmit one or more messages, for example, a text message, an email message and/or the like to one or more of the users 240, for example, the IT officer, the system administrator, the operator, the security person and/or the like. Additionally and/or alternatively, the monitoring application 210 may generate one or more alerts to one or more automated systems, for example, a security system, a Security Operations Center (SOC), a Security Information and Event Management (SIEM) system and/or the like.

As shown at 112, which is an optional step, the monitoring application 210 may initiate one or more further actions according to the classification result. Specifically, the monitoring application 210 may initiate and/or take such action(s) in case one or more of the detected mobile wireless transmitter 310 are classified as unauthorized.

Such further actions may include, for example, preventing an access initiated by the unauthorized mobile wireless transmitter(s) 310 to one or more network resources of the monitored location 300, for example, a network, an endpoint, a storage resource, a service, a database and/or the like.

In another example, the monitoring application 210 may also intimate transmission interception action(s) to intercept the wireless transmission(s) transmitted by the unauthorized mobile wireless transmitter(s) 310 in order, for example, to identify content obtained by the covert device(s) in the monitored location 300 and transmitted by the unauthorized mobile wireless transmitter(s) 310, to identify one or more intentions of the covert device(s) as may be reflected in the wireless transmission(s) and/or the like.

In another example, the monitoring application 210 may initiate transmission interruption action(s) to interrupt one or more of the wireless transmission transmitted by the unauthorized mobile wireless transmitter(s) 310 to prevent the transmissions from reaching their destination. Specifically, the monitoring application 210 may initiate such transmission interruption action(s), for example, jamming and/or the like according to the detected location, location change of the unauthorized mobile wireless transmitter(s) 310.

For example, assuming the unauthorized mobile wireless transmitter(s) 310 is located and/or moving in a certain area, the monitoring application 210 may initiate jamming in the certain area. For example, the monitoring application 210 may initiate operation of one or more jamming RF transmitters adapted to transmit RF signals for jamming the wireless transmission signals transmitted by the detected unauthorized mobile wireless transmitter 310. Initiating the operation of the jamming RF transmitters may be done directly by the monitoring application 210 and/or by instructing another application executed by the processor 204 to operate the jamming RF transmitters.

The monitoring application 210 may initiate the jamming RF transmitters to operate in the location, area and/or space in which the unauthorized mobile wireless transmitter(s) 310 is detected. Adapting the jamming measures, specifically the jamming RF transmitters according to the detected location of the unauthorized mobile wireless transmitter(s) 310 may significantly increase efficiency of the jamming action(s) as the jamming measures may be focused on the exact location of the unauthorized mobile wireless transmitter(s) 310. The monitoring application 210 may optionally configure the jamming RF transmitters to transmit RF signals configured according topology of the detection location, area and/or space.

The monitoring application 210 may further configure the jamming RF transmitters to transmit RF signals configured according to one or more RF signal characteristics of the detected unauthorized mobile wireless transmitter wireless transmission signals, for example, a frequency band, a carrier frequency, the signal strength and/or the like.

Moreover, the monitoring application 210 may invoke one or more deception measures to deceive the adversary party(s) using the covert device(s). For example, the monitoring application 210 may initiate one or more playbacks of false conversations that may be captured by the covert device(s). In another example, the monitoring application 210 may instruct a false configuration of one or more endpoints, storage resources, services, databases and/or the like which are targeted and/or accessed by the covert device(s). In another example, the monitoring application 210 may instruct transmission of false communication transmissions which may be intercepted by the covert device(s).

It is expected that during the life of a patent maturing from this application many relevant systems, methods and computer programs will be developed and the scope of the terms RF sensors and location sensors are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer implemented method of detecting unauthorized mobile wireless transmitters, comprising:
   using at least one processor configured for:
      obtaining, from at least one radio frequency (RF) sensor deployed in a monitored area, RF sensory data relating to a plurality of transmissions transmitted by at least one of a plurality of mobile wireless transmitters which moves inside said monitored area, said at least one RF sensor is configured to intercept a plurality of signals of said transmissions;
      detecting a change in a location due to physical movement of said at least one mobile wireless transmitter by analyzing said RF sensory data to identify said location change according to identification of at least one signal characteristic of said plurality of signals, wherein at least one of said at least one signal characteristic is a member of a group consisting of: a signal radiation angular distribution and a signal propagation delay of said transmissions transmitted by the at least one of the plurality of mobile wireless transmitters;
      classifying said at least one mobile wireless transmitter as unauthorized in case said detected location change deviates from at least one mobility rule defining at least one allowed movement characteristic; and
      outputting an indication of said classification.

2. The computer implemented method of claim 1, further comprising creating a spatiotemporal mobility pattern of said at least one mobile wireless transmitter based on said detected location change.

3. The computer implemented method of claim 1, wherein said at least one mobility rule is a member of a group consisting of: at least one predefined mobility pattern, a location of said at least one mobile wireless transmitter, a timing of at least one of said plurality of transmissions, a type of said transmission, a protocol of a timing of at least one of said plurality of transmissions, a size of a timing of at least one of said plurality of transmissions, an identification (ID) of said at least one mobile wireless transmitter and an authentication of said at least one mobile wireless transmitter.

4. The computer implemented method of claim 1, wherein at least another one of said at least one signal characteristic is a signal strength.

5. The computer implemented method of claim 1, wherein said at least one RF sensor comprises at least one Doppler Effect sensor configured to capture at least one Doppler shift in at least one carrier signal of at least one of said plurality of transmissions, said analysis comprises identifying said location change according to said identified at least one Doppler shift.

6. The computer implemented method of claim 1, further comprising obtaining said RF sensory data from a plurality of RF sensors, said analysis comprises identifying said location change by triangulating an origin point of at least some of said plurality of transmissions which is indicative of a location of said at least one mobile wireless transmitter.

7. The computer implemented method of claim 1, wherein said analysis further comprising correlating said location change with a carrier location change of a carrier hosting said at least one mobile wireless transmitter detected by analyzing location sensory data obtained from at least one location sensor, said carrier is a member of a group consisting of: a person, a mobile robotic device and a drone.

8. The computer implemented method of claim 7, wherein said at least one location sensor is an acoustic sensor configured to intercept a sound generated by said carrier.

9. The computer implemented method of claim 7, wherein said at least one location sensor is an air pressure sensor configured to identify at least one air pressure shift induced by said carrier.

10. The computer implemented method of claim 1, wherein said at least one location sensor is a motion sensor configured to identify a motion of said carrier.

11. The computer implemented method of claim 1, wherein said at least one location sensor is an imaging sensor configured to capture at least one image of at least part of said monitored area, said at least one image is analyzed to identify said carrier.

12. The computer implemented method of claim 1, wherein said classification is further based on an identification of said at least one mobile wireless transmitter.

13. The computer implemented method of claim 1, wherein said classification is further based on an authentication sequence conducted with said at least one mobile wireless transmitter.

14. The computer implemented method of claim 1, further comprising initiating at least one action according to said classification, said at least one action is a member of a group consisting of: generating an alert, preventing an access initiated by said at least one mobile wireless transmitter to at least one network resource of said monitored area, intercepting said transmission, interrupting said transmission and invoking at least one deception measure.

15. The computer implemented method of claim 12, further comprising interrupting at least some of said plurality of transmissions using at least one RF transmitter configured to jam said transmission according to a location of said at least one mobile wireless transmitter.

16. A system for detecting unauthorized mobile wireless transmitters, comprising:
   at least one processor configured to execute code, said code comprising:
      code instructions to obtain, from at least one radio frequency (RF) sensor deployed in a monitored area, RF sensory data relating to a plurality of transmissions transmitted by at least one of a plurality of mobile wireless transmitters which moves inside said monitored area, said at least one RF sensor is configured to intercept a plurality of signals of said transmissions;

code instructions to detect a change in a location due to physical movement of said at least one mobile wireless transmitter by analyzing said RF sensory data to identify said location change according to identification of at least one signal characteristic of said plurality of signals, wherein at least one of said at least one signal characteristic is a member of a group consisting of: a signal radiation angular distribution and a signal propagation delay of said transmissions transmitted by the at least one of the plurality of mobile wireless transmitters;

code instructions to classify said at least one mobile wireless transmitter as unauthorized in case said detected location change deviates from at least one mobility rule defining at least one allowed movement characteristic; and code instructions to output an indication of said classification.

17. The computer implemented method of claim 2, wherein said at least one mobility rule defines at least one predefined spatiotemporal mobility pattern typical to at least one authorized mobile wireless transmitter and wherein said at least one mobile wireless transmitter is classified as unauthorized in case said detected location change deviates from said at least one predefined spatiotemporal mobility pattern.

18. The computer implemented method of claim 11, wherein a detection of a movement or a location change of said carrier is conducted by analyzing a series of subsequent images captured by said imaging sensor.

19. The computer implemented method of claim 12, wherein said classification based on said identification of said at least one mobile wireless transmitter is conducted by comparing said identification to at least one of a black list of unauthorized mobile wireless transmitters and a white list of authorized mobile wireless transmitters.

20. The computer implemented method of claim 1, wherein said at least one mobility rule is configured according to at least one of characteristics of relevant threats and characteristics of the monitored area.

21. The computer implemented method of claim 1, wherein said obtaining is triggered by said at least one RF sensor in response to a detection of said plurality of signals of said transmissions, by said at least one RF sensor.

\* \* \* \* \*